United States Patent [19]
Duong

[11] Patent Number: 5,158,133
[45] Date of Patent: Oct. 27, 1992

[54] EVAPORATION HEAT EXCHANGER, ESPECIALLY FOR A SPACECRAFT

[75] Inventor: Linh Duong, Weyhe, Fed. Rep. of Germany

[73] Assignee: ERNO Raumfahrttechnik GmbH, Bremen, Fed. Rep. of Germany

[21] Appl. No.: 837,002

[22] Filed: Feb. 14, 1992

[30] Foreign Application Priority Data

Feb. 14, 1991 [DE] Fed. Rep. of Germany ....... 4104432

[51] Int. Cl.$^5$ .............................................. F28F 7/00
[52] U.S. Cl. ........................................ 165/78; 165/41; 165/76; 165/110; 165/154
[58] Field of Search ...................... 165/78, 154, 76, 41, 165/110; 60/752

[56] References Cited

U.S. PATENT DOCUMENTS

| | | | |
|---|---|---|---|
| 3,053,283 | 9/1962 | Allen et al. | 165/54 |
| 3,986,551 | 10/1976 | Kilpatrick . | |
| 4,349,723 | 9/1982 | Swiatosz . | |
| 4,903,762 | 2/1990 | Marsais et al. | 165/78 |

OTHER PUBLICATIONS

Article Entitled: "Shuttle Orbiter Flash Evaporator", by J. R. Nason; Hamilton Stardard, 79-ENAs-14, American Society of Mechanical Engineers (Hrsg.) pp. 1-7, Apr. 2, 1979.

Primary Examiner—Albert W. Davis, Jr.
Attorney, Agent, or Firm—W. G. Fasse

[57] ABSTRACT

An evaporation heat exchanger, especially for removing heat from a spacecraft, has a housing formed by an inner cylinder and an outer cylinder which enclose a ring gap between the cylinders. A medium to be evaporated is injected into an evaporation chamber inside the inner cylinder. A cooling liquid is passed through the ring gap. Flow influencing elements are arranged in the ring gap for enhancing the heat transfer onto the inner surface of the inner cylinder for the evaporation. The flow control elements cause an eddy current of the cooling liquid. Additionally, these elements are shaped with interlocking projections and recesses to provide a mechanical coupling between the inner and outer cylinders. This coupling is capable of taking up radially extending forces in a force-locking manner, thereby preventing the bulging of the cylinders, even if the pressure in the ring gap should increase.

10 Claims, 3 Drawing Sheets

EVAPORATION HEAT EXCHANGER, ESPECIALLY FOR A SPACECRAFT

CROSS-REFERENCE TO RELATED APPLICATION

The present invention relates to U.S. application Ser. No.: 07/713,802, filed on Jun. 12, 1991, entitled: EVAPORATION HEAT EXCHANGER, ESPECIALLY FOR A SPACECRAFT.

FIELD OF THE INVENTION

The invention relates to an evaporation heat exchanger, especially for spacecraft. Such heat exchangers have an active liquid cooling circuit for the removal of heat out of a spacecraft. The cooling liquid flows in thermal contact with a medium to be evaporated.

BACKGROUND INFORMATION

Conventional heat exchangers of this type comprise a cylindrical container holding the medium to be evaporated and having a double wall forming a ring gap between an inner wall shell and an outer wall shell. The cooling medium flows through the ring gap which is equipped for an improved heat transfer between the cooling medium and the medium to be evaporated. The heat transfer improving components are ribs which may be connected to one or both wall shells.

A heat exchanger of this type is described in a publication entitled "Shuttle Orbiter Flash Evaporator", by J. R. Nason, Hamilton Standard, 79-ENAs-14, published by American Society of Mechanical Engineers, Apr. 2, 1979. In such evaporator heat exchangers, a cooling liquid that cooperates with several active cooling circuits is caused to thermally contact the medium to be evaporated. The medium to be evaporated is sprayed into the inner evaporation chamber of the heat exchanger through an injection nozzle to form a jet of liquid droplets to be evaporated. These droplets contact the inner surfaces of the double wall enclosing the evaporation chamber of the evaporator, whereby the droplets take up heat from the cooling liquid and thus are evaporated. The resulting steam or vapor is discharged into the environment of the spacecraft through an exhaust duct and port.

The operating conditions imposed by a spacecraft, especially the condition of weightlessness and the different accelerations and decelerations during starting and landing, entail a basic problem. That problem involves maintaining the medium to be evaporated and the cooling liquid of the cooling circuit in an efficient heat exchange contact with each other to assure the required high heat exchange for the evaporation. The problem becomes more pronounced because the medium to be evaporated is normally taken along at the expense of additional payload in the spacecraft. Thus, it is desirable that the medium to be evaporated is converted completely into the vapor phase or steam.

With the above problems in mind, the double wall of the evaporator container or housing is equipped with longitudinal ribs for improving the heat exchange between the cooling liquid and the medium to be evaporated. The cooling ribs extend in the flow direction of the cooling liquid in the ring gap between the inner and outer wall shell. The cooling ribs are made of corrugated sheet metal bent into a cylindrical shape connected to the inner and outer wall shells by hard soldering or brazing or the like, which are difficult time consuming operations.

The connection of the ribs with the two wall shells by soldering or welding, is quite involved and expensive in a manufacturing sense, especially in connection with modern materials, such as high strength aluminum alloys. However, such welding or brazing solves the problem that the two wall shells have a tendency to bulge in operation, especially since these wall shells are relatively thin. The bulging can be caused due to the fact that on the one hand it is desirable to keep the wall shells thin to reduce weight, and on the other hand, a hot medium flows through the ring gap between the wall shells, whereby this hot medium may even be under excess pressure. As a result, the gap facing surfaces of the wall shells forming the ring gap, are exposed to compression stress which may result at least in elastic deformations of these wall shells in a radial direction.

If the wall shells are not rigidly interconnected by the ribs brazed or welded to the wall shells, the compression stress can cause a bulging of both wall shells. Such bulging is undesirable, because it exposes the material of the heat exchanger walls to increased stress and such bulging may adversely influence the flow dynamic conditions for the cooling medium flowing through the ring gap. This problem has been encountered, especially where the ribs, different from the above described known orbiter-flash evaporator, are not connected to both wall shells, but only to one of the wall shells, for example the inner wall shell while merely loosely contacting the other shell. Such a construction has substantial manufacturing advantages compared to the evaporation heat exchanger in which the ribs are brazed or welded to both wall shells. By manufacturing the ribs as an integral component with one or the other wall shell, the problems of welding inside the narrow heat exchanger gap between the two wall shells is avoided. However, the above bulging is not avoided. This problem applies, as mentioned above, especially to heat exchangers that are made of high strength aluminum alloys as is customary in spacecraft technology. Avoiding the problem in the manner taught by the above mentioned orbiter flash evaporator is involved and expensive because the ribs inside the flow gap are hard to access for the brazing or welding, whereby substantial quality control measures must be taken to assure a proper connection of the ribs to both wall shells.

U.S. Pat. No. 4,349,723 (Swiatosz) discloses a ring gap construction in which a heat transfer fin is mounted between an inner and outer wall shell by means of spot welding to hold the fin in position. The fin has a helical configuration to cause a fluid flow along a helical path through the ring gap. The spot welding merely reduces the problems without eliminating them.

U.S. Pat. No. 3,986,551 (Kilpatrick) discloses a heat exchanger structure in which parallelogram shaped fins are attached to both inwardly gap facing surfaces of the wall shells forming the gap. Neighboring fins are separated by diagonally cut grooves in such a way that one set of grooves is wider than the other set of grooves for an efficient flow control. However, no provisions are made for interconnecting the inner and outer wall shells.

OBJECTS OF THE INVENTION

In view of the foregoing it is the aim of the invention to achieve the following objects singly or in combination:

- to avoid the construction problems outlined above, more specifically, to avoid welding or brazing connections between the inner and outer wall shells of a heat exchanger, while still effectively interconnecting these wall shells to avoid the above mentioned bulging;
- to assure an efficient heat exchange between the fluids to be evaporated inside the evaporation space and the cooling fluid passing through the ring gap; and
- to provide a rigid connection between the inner and outer wall shells while still reducing the weight of the entire structure and without any brazed or welded connections.

SUMMARY OF THE INVENTION

A heat exchanger according to the invention is characterized in that the ribs in the ring gap between an inner wall shell and an outer wall shell of the heat exchanger are constructed as interlocking components, whereby projections of rib sections on the gap facing wall of the inner wall shell engage recesses of the rib sections on the gap facing surface of the outer wall shell, and vice versa in an interlocking manner. Preferably, the interlocking recesses and projections are of a dovetail construction, whereby the interlocking is simply achieved, e.g. by axially sliding one of the wall shell with its recesses onto the projections of the other wall shell without any welding or brazing connections. When these interlocking connections are exposed to radially extending expansion forces, a force-locking interengagement between the inner and outer wall shells is assured while simultaneously maintaining an efficient heat exchange between the cooling liquid flowing through the ring gap and the medium to be evaporated in the inner evaporation or operating space of the heat exchanger.

Due to the force-locking connection between the two wall shells as achieved by the invention, the present heat exchanger provides several advantages. First, the projections and recesses provide a flow dynamically efficient cross-sectional configuration of the flow gap between the two wall shells. Second, even if the pressure inside the gap should increase, the shape of the gap is exactly maintained by the interlocking. Third, the entire heat exchanger structure is mechanically strengthened in a simple manner avoiding brazing and welding. The force-locking connection between the inner and outer wall shells is achieved in a simple manufacturing operation in that, for example, the outer surface of the inner wall shell is provided with dovetail type recesses, and the inwardly facing surface of the outer wall shell is provided with respective dovetail type projections for engaging the recesses. The interlocking can be achieved in the above mentioned manner by actually pushing the inner cylinder into the outer cylinder and/or by a mutual circumferential rotation of one cylinder relative to the other to form the form-locking, force-transmitting interconnection between the projections and recesses.

Other advantages of the invention are seen in that the wall thicknesses of the two wall shells can be reduced by the recesses between neighboring projections so that the weight of the entire structure is substantially reduced. Additionally, the ribs can be machined as integral components on the outer surface of the inner shell and on the inner surface of the outer shell. This integral construction assures an efficient heat transfer of the cooling liquid to the medium to be evaporated, thereby providing a high efficiency of the heat exchanger.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
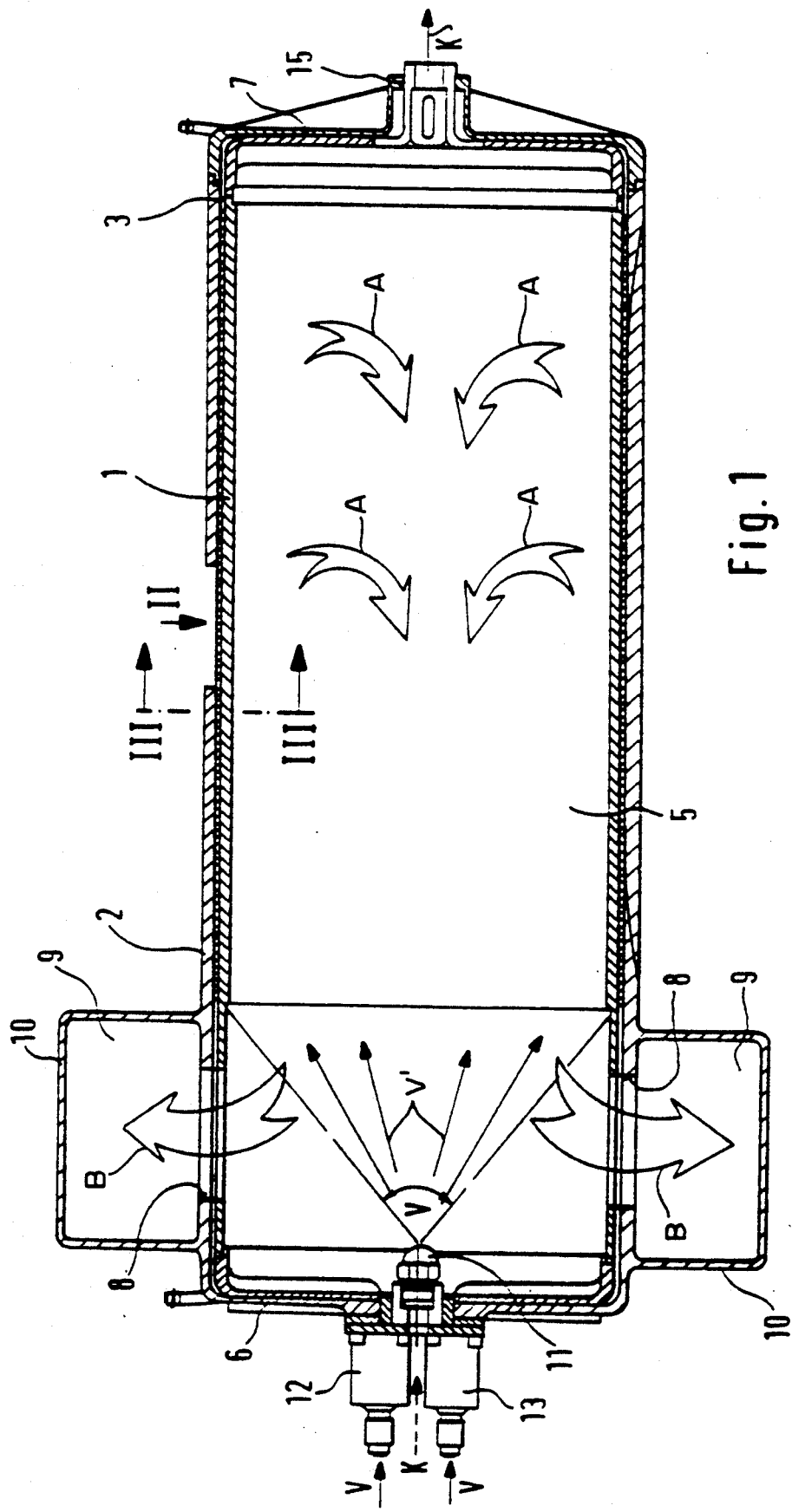
FIG. 1 is a longitudinal section through a heat exchanger according to the invention.

FIG. 1 shows a heat exchanger comprising, for example, a cylindrical housing having an inner wall shell 1 coaxially arranged in an outer wall shell 2. The two wall shells 1 and 2 are so dimensioned that a flow ring gap 3 is formed between the two shells. Eddy flow causing elements 4 are arranged as rib type flow control elements in the gap 3. The elements 4 are machined into the outer surface of the inner shell 1 or into the inner surface of the outer shell or both. The shape and detailed construction of these elements 4 will be described in more detail below with reference to FIGS. 2 and 3.

The cylindrical evaporation chamber 5 is closed by a head plate 6 at one end and by a bottom plate 7 at the other end. These plates 6 and 7 are also constructed as double shells or with flow channels passing through these plates 6 and 7. The two shells of the end plates are interconnected by conventional means, for example, by a so-called bayonet or quarter turn interlock.

An exhaust duct 10 surrounds the outer wall shell 2 near the head plate 6. Exhaust openings 8 lead from the inner chamber 5 into the ring space 9 enclosed by the exhaust duct 10. The outlets 8 are distributed around the circumference of the housing.

The head plate 6 carries an injection nozzle 11 for the medium to be evaporated. Such evaporation medium is, for example water. The nozzle 11 reaches into the processing chamber 5 and is controlled through two control valves 12 and 13 provided for redundance reasons. The discharge angle V of the nozzle 11 is about 80° so that the outlet openings 8 are outside the spray cone. An inlet for the cooling liquid leads into the flow channels of the head plate 6. Such inlet is not visible in FIG. 1, but the flow direction of the cooling liquid is indicated by the arrows K. Arrows V' indicate the flow of the medium to be cooled. The cooling liquid may also be water. The bottom plate 7 is provided with an outlet 15 for the discharge of the cooling liquid as indicated by the arrow K. A temperature sensor may be provided at or near the outlet 15 for measuring the exit temperature of the cooling liquid.

Such temperature may be used for the control of the heat exchanger, especially the valves 12 and 13.

Figure 2:
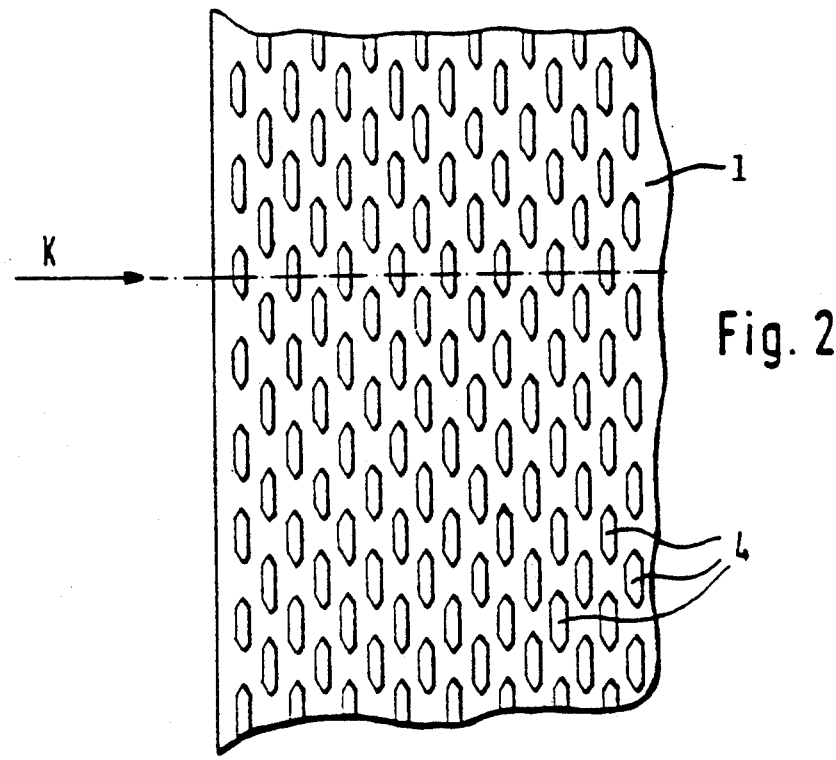
FIG. 2 shows a plan view in the direction of the arrow II in FIG. 1, illustrating the surface construction forming the flow channels in the ring flow gap.
Figure 3:
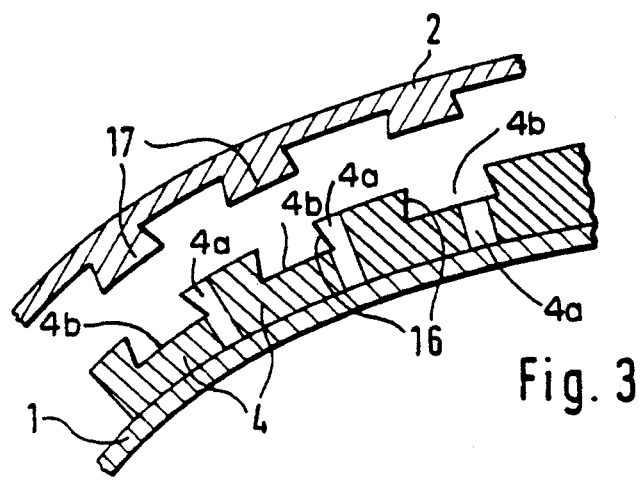
FIG. 3 is a sectional, enlarged view along section line III in FIG. 1 illustrating a dovetail type of construction of the flow control ribs in the ring gap.

Referring to FIGS. 2 and 3, the eddy flow control elements 4 have an elongated hexagonal configuration. The channels between the elements 4 are formed by a milling operation, whereby the elements 4 form integral components of the wall shell 1. The length axis of the elements 4 extends circumferentially around the inner wall shell 1 and thus perpendicularly to the flow direction K of the cooling liquid as best seen in FIG. 2. The elements 4 form a type of interrupted rings or ribs around the circumference of the inner wall shell 1, whereby the elements of neighboring rings are staggered relative to each other in the circumferential direction so that the flow K must meander around the pointed ends of the elements 4. As seen in FIG. 3, the flow control elements 4 form capillary type channels 4a in the surface of the inner shell 1 in addition to dovetail type recesses 4b. Referring to FIG. 3, the two wall shells 1 and 2 are shown spaced from each other to fully illustrate the above mentioned dovetail recesses 4b on the gap facing surface of the inner wall shell 1 and the dovetail interlocking projections 17 on the gap facing surface of the outer wall shell 2. The recesses 4b have walls 16 which engage respective projections 17 on the inwardly facing surface of the outer wall shell 2 for mechanically interlocking the inner and outer wall shells 1 and 2 with each other. The projections 17 are also preferably integral components of the outer wall 2 and extend in an axial direction, for example. The recesses 4b and the projections 17 are so dimensioned that the above mentioned interlocking is a form-locking and force-locking connection between the wall shells 1 and 2.

Figure 4:
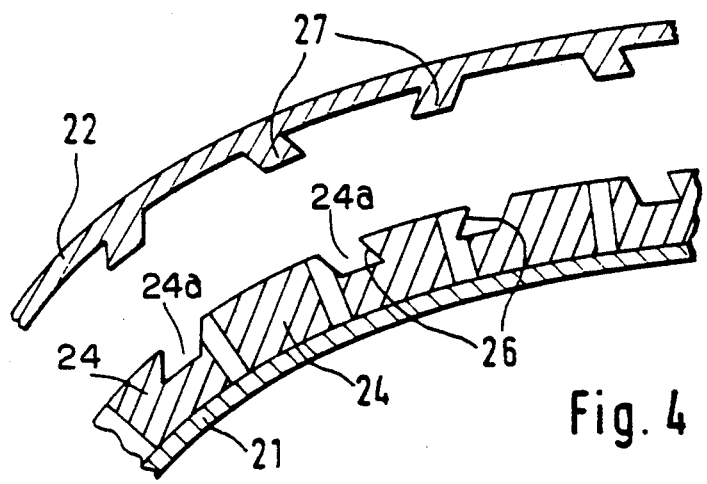
FIG. 4 is a view similar to that of FIG. 3, but showing a modified construction of the interlocking elements.

FIG. 4 shows a modified construction of the interlocking members. An inner cylinder 21 is provided in its flow control elements 24 with recesses 24a having slanted walls 26 for engaging slanted hook-type projections 27 projecting from the gap facing inner surface of the outer cylindrical wall 22. The recesses 24a and the projections 27 have a parallelogram type cross-sectional configuration.

Figure 5:
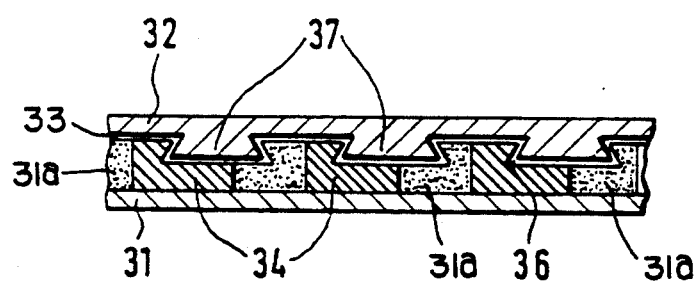
FIG. 5 is a view similar to FIGS. 3 and 4, but illustrating yet another dovetail interlocking construction.

FIG. 5 shows an embodiment in which the flow control elements 34 of the inner housing wall 31 extend in the longitudinal axial direction of the heat exchanger. The flow channels 31a are shown by a stippling. The elements 34 forming the flow control ribs are again provided with dovetail type recesses for receiving dovetail projections 37 of the outer housing wall 32. The stippling is intended to show the cooling liquid. There is a little gap shown between the elements 34 and 37. However, in fact, the two cylinder sections engage in a forx-and force-locking manner. The projections 37 and respective recesses 36 extend in a circumferential direction of the cylinder housing, whereby these projections and recesses 37, 36 may extend in the manner of an interrupted threading on the inwardly facing surface of the outer housing wall and the outwardly facing surface of the inner housing wall.

For mounting the inner wallshell into the outer wall shell, the embodiments shown in FIGS. 3 and 4 permit an axial movement of one of the wall shells 1 and 2 or 21 and 22 relative to the other. On the other hand, in FIG. 5 one cylinder is threaded into or onto the other cylinder. For this purpose, one cylinder is rotated relative to the other around the longitudinal cylinder axis. In both instances, a force-locking connection between the two cylinders is achieved so that any increase in the internal pressure in the ring gap 3 is taken up without any bulging of the shells or cylinder walls. Any radial tensile stress caused by an increase in the internal pressure in the gap 3 or 33 is thus effectively taken up.

The operation or function of a heat exchanger as shown in FIG. 1 is illustrated by the above mentioned arrows K indicating the flow of the cooling liquid and the arrows A indicating the flow of the medium to be evaporated inside the chamber 5 and exhausted as indicated by the arrows B.

The cooling liquid flows in a closed cooling circuit passing through the evaporation heat exchanger by entering into the heat exchanger at the left-hand end through an inlet in the head plate 6 then passing through the ring gap 3 in contact with the flow control elements 4 forming the above mentioned ribs to the base plate 7 and out through the outlet opening 15 where the temperature of the cooling liquid is measured. As soon as the outlet temperature of the cooling liquid exceeds a predetermined value, the control inlet valves 12 and 13 are activated for supplying medium to be evaporated through the injection nozzle 11 into the chamber 5. The spray is so directed that the fine liquid droplets produced by the nozzle 11 hit the inner surface of the wall shell 1. The control valves 12 and 13 are operated in an intermittent or pulse mode operation.

The liquid film of droplets sprayed onto the inner surface of the wall shell 1 in the chamber 5 is instantly evaporated due to the following conditions. The heat introduced through the elements 4 is effectively transferred to the inwardly facing surface of the wallshell 1. Further, a low pressure is maintained in the evaporating chamber 5. This low pressure is less than 1 mbar during those periods when no medium to be evaporated is injected. The capillary structure of the shell wall enhances the just described evaporation. The generated vapor indicated by the arrows A in the chamber 5 increases the pressure in the chamber 5 by about five to ten mbar. The vapor flows eventually contrary to the injection direction V' toward the outlet opening 8 and through the ring duct 9 from which the vapor is exhausted through the exhaust duct 10. A discharge valve, not shown, may be provided in the exhaust duct 10.

The intervals during which medium to be evaporated is not injected into the chamber 5 are so selected that the inner surface of the wall shell 1 and also the inner surface of the head plate 6 and of the bottom plate 7 are completely dried before the next injection step.

The inner surface of the wall shell 1 is roughened to provide a capillary type structure which makes sure that the medium to be evaporated is uniformly or evenly distributed in the radial direction. The elements 4 which form the ribs, serve for several purposes. First, the elements with their configuration and position influence the flow of the cooling liquid, thereby causing a more intense heat release. Second, these elements 4 increase the heat transfer from the cooling liquid onto the wallshell 1, and thus onto the inner surface of the wall shells 1 which causes the evaporation. Further, these ribs assure, according to the invention, a mechanical coupling between the inner and outer wall shells. This mechanical coupling withstands even increased internal pressures in the ring gap 3 so that a deformation of the wall shells and any change in the flow cross-sectional areas in the ring gap 3 are prevented.

Although the invention has been described with reference to specific example embodiments, it will be appreciated that it is intended to cover all modifications and equivalents within the scope of the appended claims.

What I claim is:

1. An evaporation heat exchanger especially for a spacecraft, comprising a housing including an inner housing shell and an outer housing shell enclosing the inner housing shells to form a ring gap between the two housing shells, means for injecting an evaporation medium into said inner housing shell, means for circulating a cooling medium through said ring gap, flow control and heat transfer elements in said ring gap, said elements being an integral part of gap facing surfaces of said housing shells, recesses and projections in said gap facing surfaces of said housing shells, said projections in one housing shell interlocking with recesses of the other housing shell and vice versa to provide a mechanical interlocking between said housing shells across said ring gap for taking up radially effective tensile stress and for maintaining constant cross-sectional flow areas through said ring gap.

2. The heat exchanger of claim 1, wherein said recesses and projections have dovetail configurations.

3. The heat exchanger according to claim 1, wherein said recesses and projections have a parallelogram cross-sectional configuration.

4. The heat exchanger of claim 1, wherein said flow control and heat transfer elements are an integral component of the gap facing surface of the inner housing shell.

5. The heat exchanger of claim 1, wherein the projections are integral components of one of the housing shells on the gap facing surface thereof.

6. The heat exchanger of claim 1, wherein said flow control and heat transfer elements form interrupted ribs extending circumferentially in said ring gap.

7. The heat exchanger of claim 1, wherein said flow control and heat transfer elements form ribs extending axially in said ring gap.

8. The heat exchanger of claim 1, wherein said flow control and heat transfer elements form interrupted ribs in the ring gap.

9. The heat exchanger of claim 1, wherein at least one of said recesses and said projections form part of said flow control and heat transfer elements.

10. The heat exchanger of claim 1, wherein said inner and outer housing shells form a cylindrical housing, and wherein said recesses and projections in said gap run as a helical threading between said shells.

* * * * *

UNITED STATES PATENT AND TRADEMARK OFFICE
CERTIFICATE OF CORRECTION

PATENT NO. : 5,158,133
DATED : October 27, 1992
INVENTOR(S) : Linh Duong It is certified that error appears in the above-identified patent and that said Letters Patent is hereby corrected as shown below:

In claim 1, column 7, line 7, delete "especially for a"

column 7, line 8, delete "spacecraft".

Signed and Sealed this

Fifth Day of October, 1993

*Attest:*

BRUCE LEHMAN

*Attesting Officer*     Commissioner of Patents and Trademarks